UNITED STATES PATENT OFFICE.

GEORGE S. PAGE, OF PITTSBURG, PENNSYLVANIA, ASSIGNOR TO CRUCIBLE STEEL COMPANY OF AMERICA, OF PITTSBURG, PENNSYLVANIA, A CORPORATION OF NEW JERSEY.

TREATING PIG-IRON.

No. 867,593.

Specification of Letters Patent.

Patented Oct. 8, 1907.

Application filed April 18, 1906. Serial No. 312,509.

*To all whom it may concern:*

Be it known that I, GEORGE S. PAGE, residing at Pittsburg, in the county of Allegheny and State of Pennsylvania, a citizen of the United States, have invented or discovered certain new and useful Improvements in Treating Pig-Iron, of which improvements the following is a specification.

In the manufacture of crucible steel, it is the practice to charge the crucible with scrap steel, wrought iron and washed metal, which latter usually contains not less than 4.00% of carbon. As it is difficult to obtain scrap sufficiently low in phosphorus, it is customary to use a smaller percentage of scrap and a larger percentage of washed metal in charging the crucibles. This practice is not objectionable in the manufacture of high carbon steel but is not available in making low carbon steel on account of the high percentage of carbon in the washed metal.

The invention described herein has for its object the production from pig iron of a metal which can be substituted in part at least for scrap metal in the production of low carbon crucible steel.

The invention is hereinafter more fully described and claimed.

In the practice of the invention the hearth of the furnace employed for the production of the metal and which may be of the stationary or movable type, is prepared with dolomite magnesite etc. in the manner well known in the art. In order to form a highly basic slag for the elimination of the phosphorus from the pig metal, suitable material such as oxid of iron and lime are first charged into the furnace. It is preferred that the oxid of iron should be crushed or broken up before being charged into the furnace. Pig metal is next charged into the furnace and its temperature raised to effect the melting of the pig metal and the basic charge. The pig metal will melt first and come into contact with the ore gradually as the melting progresses, thus permitting a dephosphorization without any violent reaction. As the melting progresses and the temperature of the charge in the furnace rises the molten metal is brought into intimate relation with the basic slag, which will take up and retain the phosphorus from the metal. If a furnace having a stationary hearth is employed, suitable means known in the art as a hickory pole, is employed for agitating the charge to cause an intimate commingling of the metal with the basic slag. During the melting and subsequent heating of the charge the manganese will first be oxidized and eliminated and the charge will be desiliconized and decarbonized.

While there will probably be a quite rapid combination of the phosphorus with the slag as the charge reaches what is known as a critical temperature for the elimination of the phorphorus, this combination and consequent elimination of phosphorus will continue after the charge is raised above such critical temperature and during the entire treatment of the charge. This continuous elimination of phosphorus is due to the highly basic condition of the slag produced by the addition of lime to the oxid of iron. In this respect my method differs from that practiced in the manufacture of washed metal. In the latter method only oxid of iron is employed for the elimination of phosphorus, and the heat of the charge must be kept low, or at the critical temperature at which the phosphorus will combine with the slag produced by melting the oxid. If in this washed metal method the temperature of the charge be raised after the slag has taken up the phosphorus, the latter will leave the slag and recombine with the metal. Hence by reason of the low temperature necessary in the washed metal method, there is not any material elimination of the carbon, which is usually as high as 4.00% in the finished product, and therefore not adapted to the production of low carbon steel by the crucible method. This method is also to be distinguished from the open hearth method of making steel, in which there is not only an elimination of phosphorus but also a practically complete elimination of the carbon. Whereas in my method the carbon is only partially eliminated, the treatment being discontinued while the percentage of carbon is greatly in excess of that found in the highest carbon steel.

In order to avoid trouble when tapping the treated metal from the furnace, it is preferred to remove a portion of the slag during the process, but as it is desired that there should be a continuous elimination of the phosphorus during the entire treatment, all of the slag should not be removed. And further the retention of a substantial portion of the slag, will prevent a too rapid and great elimination of the carbon which should be present in substantial proportions in the finished product.

In the practice of my invention a high heat is maintained so as to effect a constant elimination of the phosphorus carbon etc. and the treatment is continued until only sufficient carbon remains to render the metal brittle when cooled and capable of being broken up into small lumps for charging into the crucible. In practice the treatment is continued until the carbon is reduced to 2.5% more or less and the phosphorus to about .003%.

After the charge has been properly treated the metal is cast onto a metal slab and suddenly cooled by streams of water. The sudden chilling will cause the metal to break up into comparatively small lumps, which can be further broken up by sledges.

I claim herein as my invention:

1. The method herein described which consists in charging iron ore and lime into a basic lined furnace, charging solid or unmelted pig metal into the furnace, subjecting the charge to a temperature at or above a dephosphorizing temperature, continuing such heating with a partial withdrawal of the slag, and thereby effecting a continued reduction of phosphorus and carbon, removing and solidifying the treated charge without further treatment.

2. The method herein described which consists in charging iron ore and lime into basic lined furnace, charging solid or unmelted pig metal into the furnace, subjecting the charge to an increasing temperature from and above the dephosphorizing temperature to effect a simultaneous elimination of phosphorus and carbon, discontinuing the treatment before the temperature has become sufficiently high to effect a reduction of the carbon of the bath to a steel percentage, and removing and solidifying the treated charge without further treatment.

In testimony whereof, I have hereunto set my hand.

GEORGE S. PAGE.

Witnesses:
WM. H. WILSON,
CHARLES BARNETT.